(12) United States Patent
Edwards (10) Patent No.: US 6,411,744 B1
(45) Date of Patent: *Jun. 25, 2002

(54) METHOD AND APPARATUS FOR PERFORMING A CLEAN BACKGROUND SUBTRACTION

(75) Inventor: Jeffrey L. Edwards, San Jose, CA (US)

(73) Assignee: Electric Planet, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,491

(22) Filed: Oct. 15, 1998

Related U.S. Application Data

(60) Provisional application No. 60/062,068, filed on Oct. 15, 1997, and provisional application No. 60/062,361, filed on Oct. 15, 1997.

(51) Int. Cl.[7] .............................................. G06K 9/32
(52) U.S. Cl. ...................................... 382/294; 345/634
(58) Field of Search ................................ 382/195, 199, 382/282, 294; 358/464; 345/131, 4, 474, 473, 677, 678, 662, 651, 633, 664–5, 634

(56) References Cited

U.S. PATENT DOCUMENTS

| | | | | |
|---|---|---|---|---|
| 4,843,568 A | * | 6/1989 | Krueger et al. | 364/518 |
| 5,227,985 A | * | 7/1993 | DeMenthon | 364/559 |
| 5,311,600 A | | 5/1994 | Aghajan et al. | |
| 5,534,917 A | * | 7/1996 | MacDougall | 348/169 |
| 5,563,988 A | | 10/1996 | Maes et al. | |
| 5,566,251 A | | 10/1996 | Hanna et al. | |
| 5,581,276 A | * | 12/1996 | Cipolla et al. | 345/156 |
| 5,623,587 A | | 4/1997 | Bulman | |
| 5,631,697 A | | 5/1997 | Nishimura et al. | |
| 5,687,306 A | | 11/1997 | Blank | |
| 5,767,867 A | | 6/1998 | Hu | |
| 5,781,198 A | | 7/1998 | Korn | |
| 5,790,124 A | | 8/1998 | Fischer et al. | |
| 5,933,529 A | * | 8/1999 | Kim | 382/199 |
| 5,990,908 A | * | 11/1999 | Thingvold | 345/474 |

OTHER PUBLICATIONS

Ngo et al.(Ngo), "Motion tracking and analysis of deformable objects by generalized active contour models", Second Asian Conference on Computer Vision, Dec. 8, 1995.*
Ngo et al.; Motion Tracking and Analysis of Deformable Objects by Generalized Active Contours; ACCV'95 Second Asian Conference on Computer Vision; Dec. 8, 1995.
3DK: The Virtual Studio; Blending real and virtual spaces; Research area: Intelligent Multimedia Systems; GMD, Nov. 24, 1994.

* cited by examiner

*Primary Examiner*—Amelia M. Au
*Assistant Examiner*—Martin Miller
(74) *Attorney, Agent, or Firm*—Van Pelt & Yi LLP (57) ABSTRACT

A background subtraction apparatus of the present invention includes a key point locator for locating key points on a known object type, a boundary point locator for locating boundary points of the known object that make up the edges of the known object, and an edge processor for processing the edges to provide a clean-edged extraction of the known object from a background image. Preferably, the key point locator includes an alignment detector for detecting alignment of an image of the known object type with a skeleton image. Still more preferably, the skeleton image is an exoskeleton image and the known object type is a human being.

22 Claims, 6 Drawing Sheets

METHOD AND APPARATUS FOR PERFORMING A CLEAN BACKGROUND SUBTRACTION

CROSS REFERENCE TO RELATED APPLICATIONS

This application claims the priority Provisional U.S. Patent Application Serial Nos. 60/062,068 and 60/062,361, both filed on Oct. 15, 1997, and both incorporated herein by reference for all purposes.

This application is related to co-pending U.S. patent application Ser. No. 08/951,089 filed Oct. 15, 1997 is incorporated herein by reference for all purposes.

BACKGROUND OF THE INVENTION

The present invention relates generally to computer vision systems and digital image processing, and more particularly to the digital extraction of an image from its background.

To produce certain special visual effects, it is often desirable to separate a foreground image from a background image. One method for accomplishing this task is referred to as "blue-screening" and involves placing a blue or other fixed-color screen (e.g. a green screen) behind the desired foreground object, typically the image of a person (the colors blue and green hue that strongly contrasts with most colors of human skin). In blue-screening, the system checks to see which pixels in the input image are not blue and labels those pixels as foreground pixels. The system can then composite, or blend, the object (i.e. the collection of all foreground pixels) onto a destination background image.

One of the disadvantages of using blue-screening for object compositing is that it requires a fixed color screen behind the object. Another disadvantage is that if any of the colors on the object, such as an item of clothing, are blue, "holes" will appear in the object in the destination image. This occurs because the pixels in the blue areas on the object will not be labeled as foreground pixels and thus will not be composited with the rest of the object, resulting in the object having holes when composited onto the destination image. Another disadvantage is, obviously, the need for a special room or screen to provide the appropriate background color.

Other prior art background subtraction procedures, from the field of computer vision, are used to eliminate the fixed color screen requirement. One procedure involves building an average background image by taking a predetermined number of sample images of a typically multi-colored background and creating a background model. For each new sample image taken, each pixel in the new image is compared to its corresponding pixel in the background model being formed. Changes are assumed to be to the foreground object, i.e. this is done to determine whether the pixel in the current sample image is a foreground ("object"). Pixels that are determined to be part of the foreground are then blended or composited onto the destination image.

One disadvantage with this procedure is if a foreground pixel happens to match its corresponding background model pixel color, it will not be considered a foreground pixel. This will introduce holes into the composited object. Another disadvantage is that shadows cast by the object often make the object, when composited, appear to have its original form plus extraneous appendages (as a result of the shadows). This is because the procedure may mistakenly label the "shadow" pixels as foreground pixels.

Yet another disadvantage is that if any portion of the background changes or if the camera is moved while the background model is being built, certain portions of the background (e.g. the portions that moved) will be incorrectly labeled as part of the foreground and be composited onto the destination image. Although there are prior art techniques for updating the background model to reflect changes, they cannot account for a constantly changing background such as one that includes a changing television screen or a window looking out onto a busy street.

As is apparent from the foregoing discussion, it has been difficult to obtain a clean-edged outline for a foreground image being extracted from a background image. One known method of creating a clean-edged outline is hand painting the outline for the background subtraction which is typically done by an application developer. While this is appropriate in the application design stage, it is not appropriate for an end user to have to hand paint or manually create the outline of the image.

SUMMARY OF THE INVENTION

The present invention creates a clean-edged extraction of a foreground image from its background in an automated and effective manner. More particularly, the present invention includes an improved method of background subtraction wherein a clean image of the object being composited or texture mapped is created through improvements in determining the outline of the object. As a result, the present invention reduces noise near the edges of an object in an input image from which the background is being "subtracted." The resulting image can be used for example, in a texture map application or for compositing.

In the texture mapping process any errors that may occur in the background subtraction or inaccuracies that arise from the background subtraction will typically remain throughout the duration of the process. The present invention provides a closed curve which is essentially a noise-reduced outline of the object that is being mapped or composited. By virtue of this process there are no holes or gaps within the object image when it is mapped or composited, since all pixels within the closed curve are reconsidered part of the object.

A background subtraction apparatus of the present invention includes a key point locator for locating key points on a known object type, a boundary point locator for locating boundary points of the known object that make up the edges of the known object, and an edge processor for processing the edges to provide a clean-edged extraction of the known object from a background image. Preferably, the key point locator includes an alignment detector for detecting alignment of an image of the known object type with a skeleton image. Still more preferably, the skeleton image is an exoskeleton image and the known object type is a human being.

A method for subtracting a background in accordance with the present invention includes locating key points on a known object type, locating boundary points of the known object that comprise edges of the known object, and processing the edges to provide a clean-edged extraction of the known object from a background image. Preferably, locating the key points include detecting the alignment of an image of the known object type with a skeleton image. Even more preferably, the key points include primary key points at extremities of an image of the human being and secondary key points near a torso of an image of the human being.

These and other advantages of the present invention will become apparent upon a study of the specification and drawings of this application.

DETAILED DESCRIPTIONS OF THE PREFERRED EMBODIMENTS

Figure 1A:
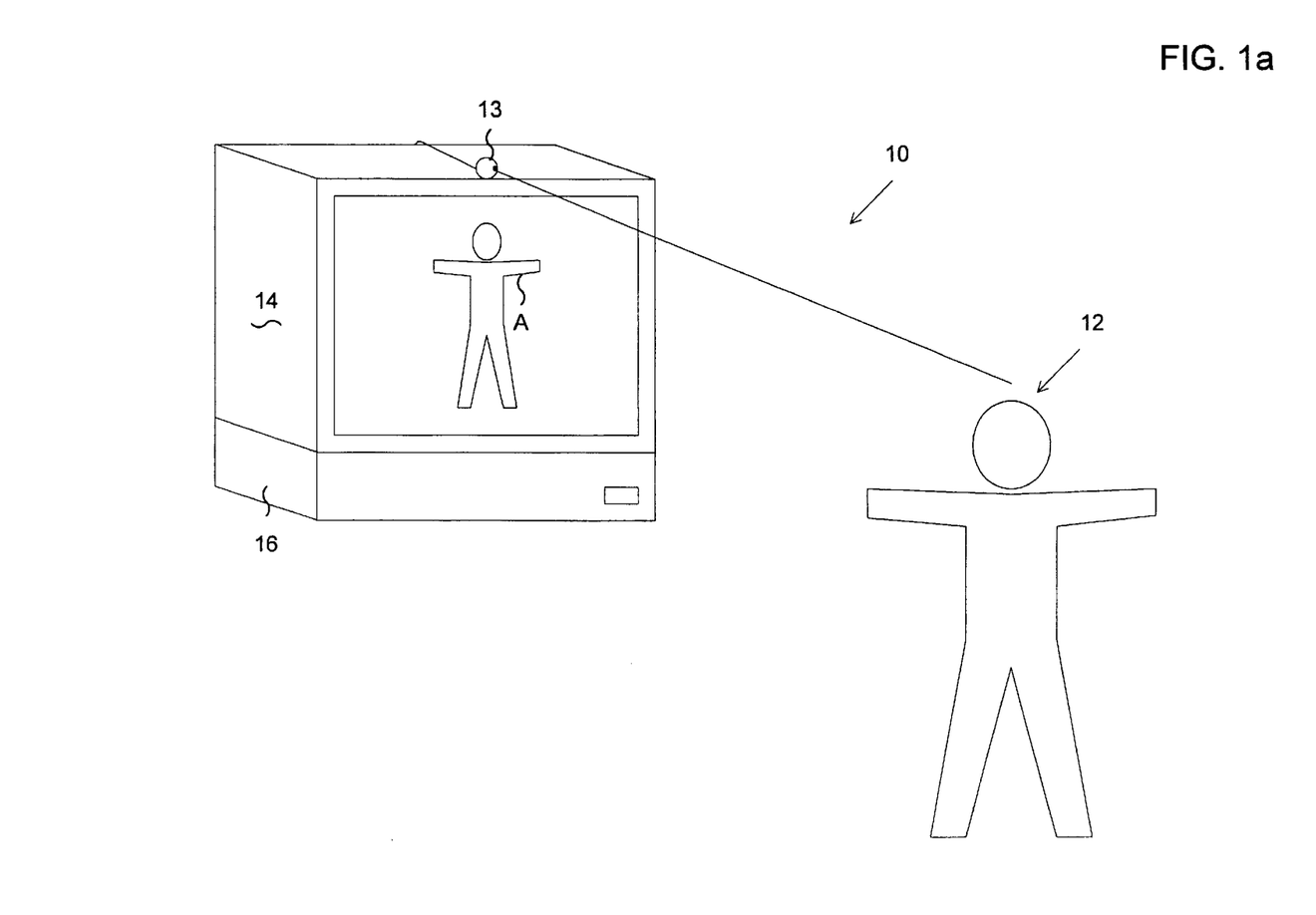
FIG. 1a is a perspective view of a person standing in front of an apparatus made and operated in accordance with the present invention.

FIG. 1a is an illustration of an apparatus 10 in accordance with the present invention. A user 12, e.g. a child, stands in front of a camera 13 in a pose in which the arms are extended outwardly and the legs are spread somewhat apart. That is, the child moves to fit herself within a skeleton "A" shown on a video monitor 14. The camera 13 and the video monitor 14 are typically connected to a computer 16, as will be appreciated by those skilled in the art. The computer 16 includes or has access to computer implemented process instructions stored within computer readable media (such as RAM, ROM, magnetic or optical media, over a network, etc.) to perform methods ("computer implement processes") of the present invention.

The skeleton A is an outline of an object or figure that is to be digitally removed from its background. When the object or figure is a human being, a preferred skeletal outline is somewhat of a hollow, five-pointed star shape. The "skeletons" described with reference to the current example are more in the nature of exoskeletons, since they surround the image of the figure to be extracted, although they can also be internal skeletons (e.g. a stick figure of a human being), or combinations thereof, in alternate embodiments of the present invention.

Figure 1B:
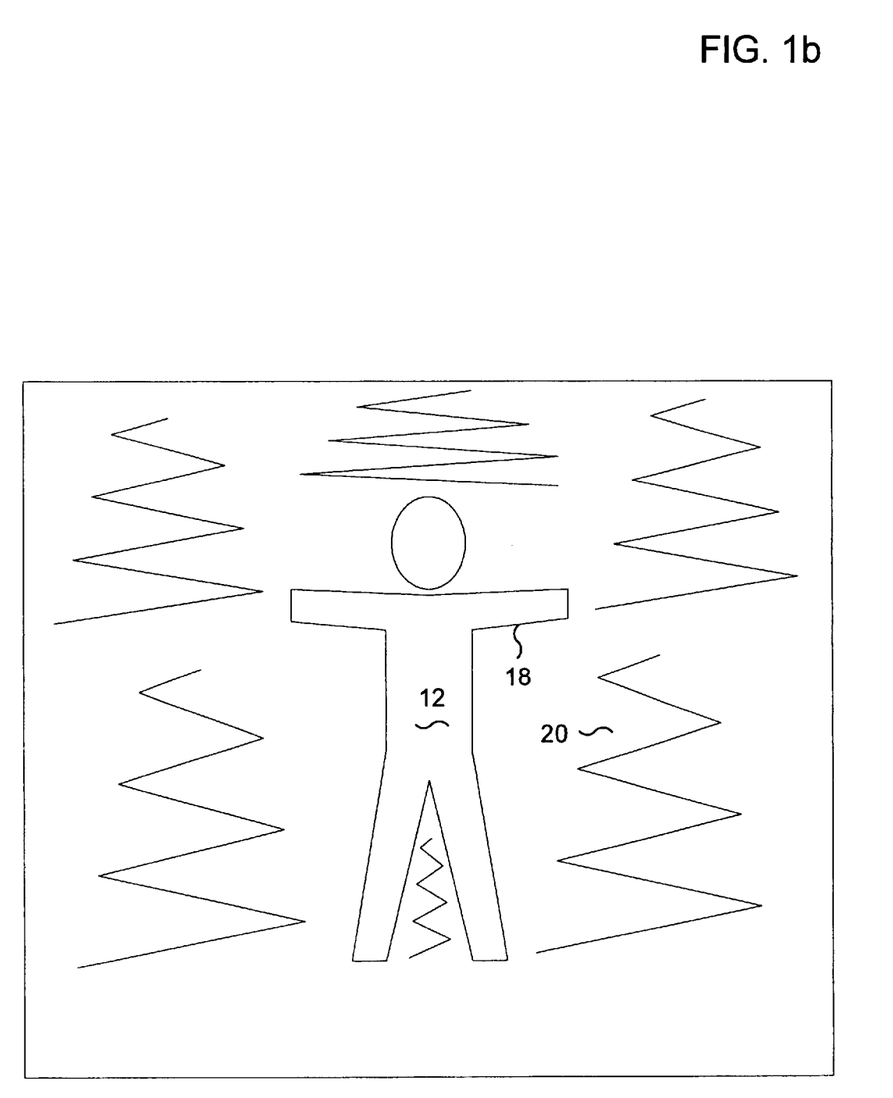
FIG. 1b is an illustration of a user's image with the background removed, where the user's image has clean edges due to the method and apparatus of the present invention.

FIG. 1b illustrates an output created by the method and apparatus of the present invention, that is, a clean image of a user with the background removed. This is shown as the image of the user 12 with a black background 20 and an outline 18 of the object with a clean edge. In a preferred embodiment, the background pixels become transparent pixels and are not the same color as any of the pixels on the object being texture mapped or composited.

Figure 2A:
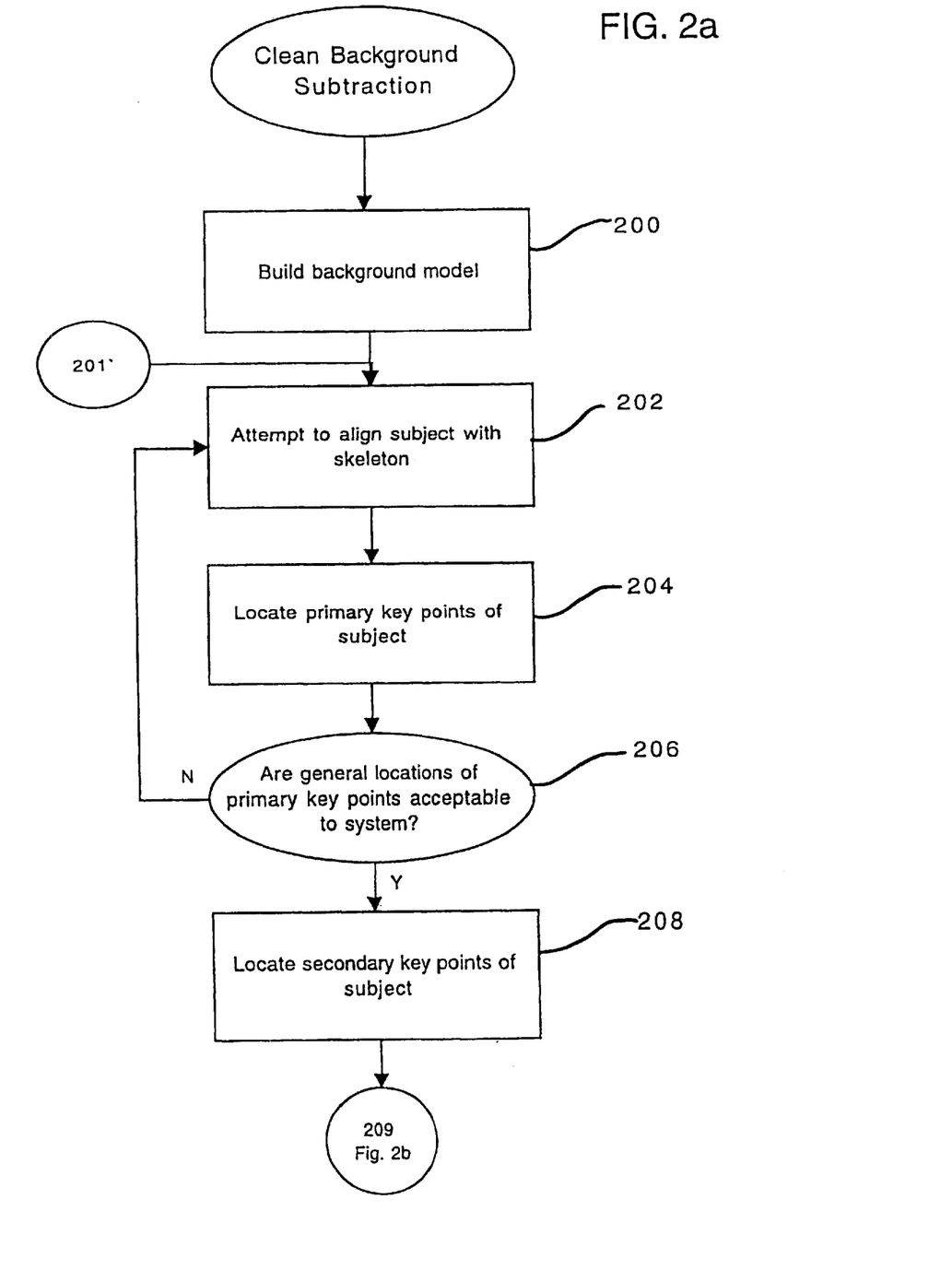
FIGS. 2a–2c comprise a flow diagram of a method for performing clean background subtraction in accordance with the present invention.
Figure 2B:
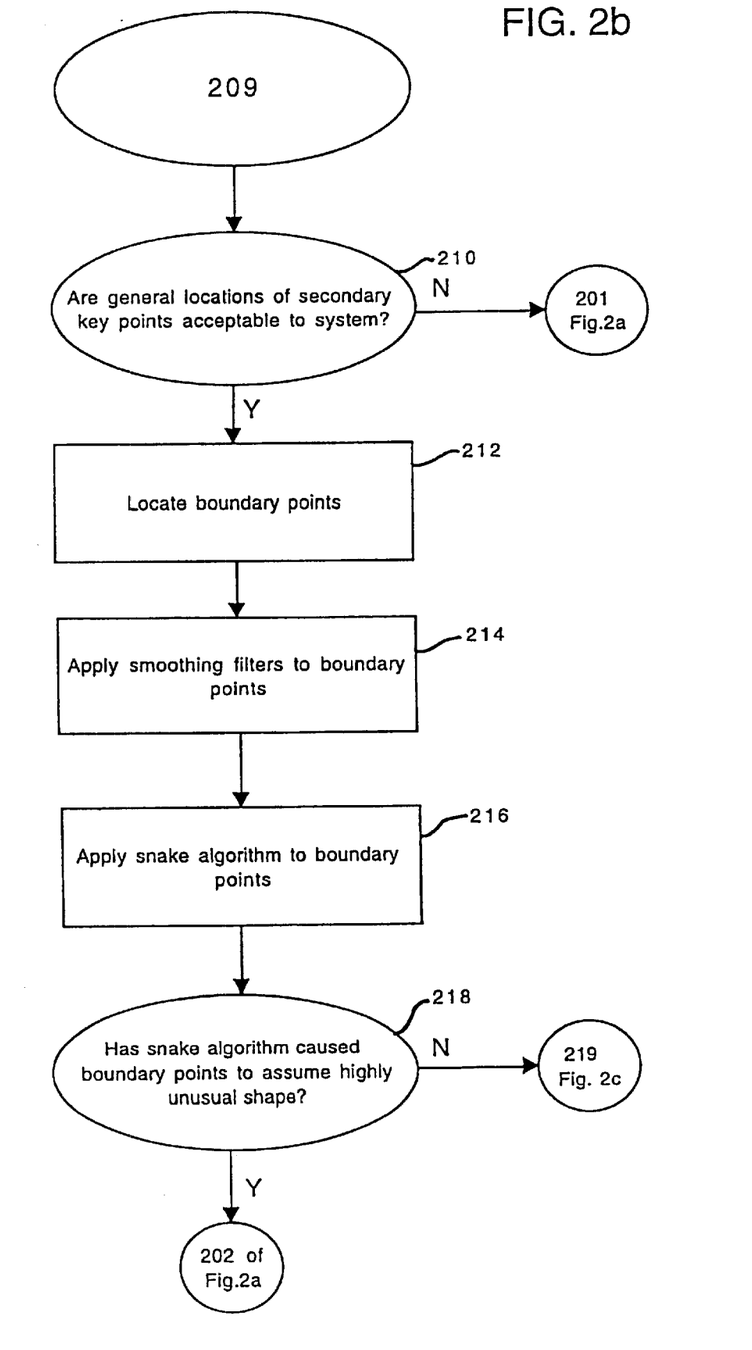
Figure 2C:
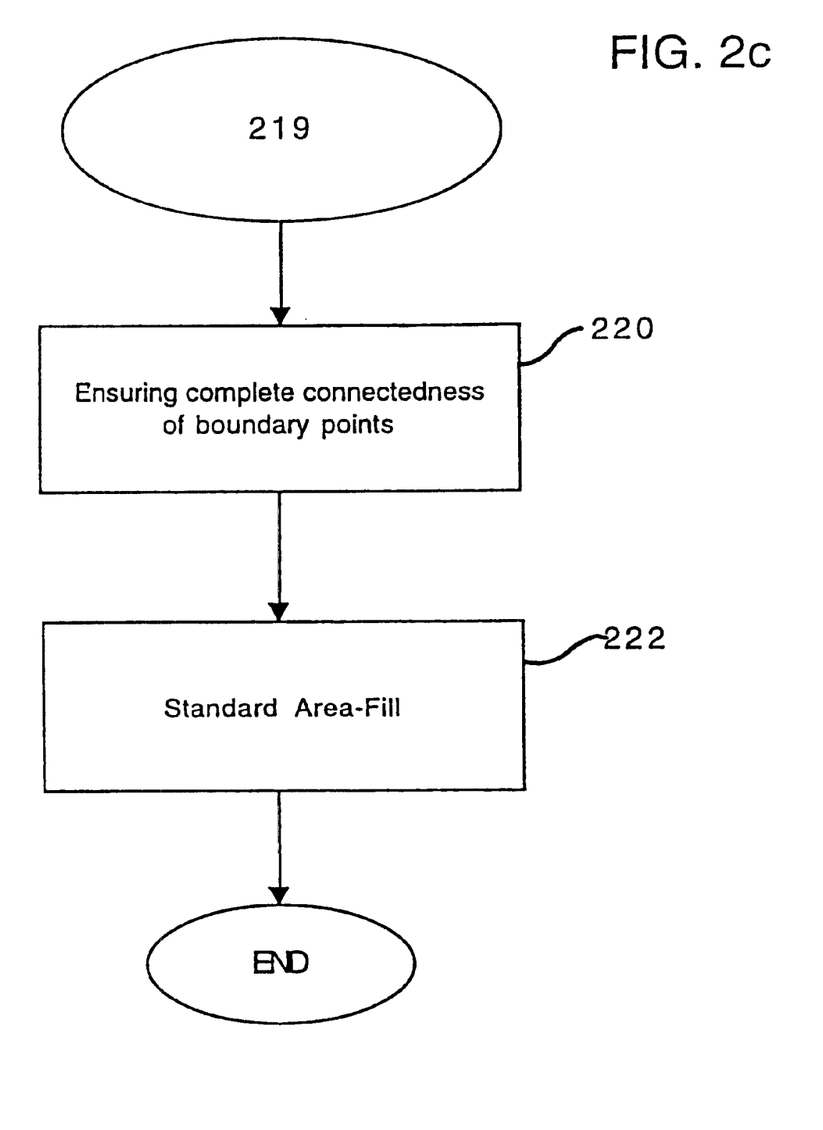

FIGS. 2a–2c are flowcharts which collectively illustrate a process (comprising, but not limited to, a computer implemented process) for performing the clean background subtraction procedure of the present invention. At 200 the system builds a background model which is a model of the background image that the camera sees without the subject in the image. Once the background model (for example an image of a bedroom or a living room) is created, the system then captures an image of the background model with the subject, such as a human being, that has moved into the background. Essentially this is an image of, for example, a child that has moved in front of the camera after the background model has been created. In a preferred embodiment, the subject is required to generally fit her pose to approximately match a frame or skeleton shown on the computer monitor. An example of a pose is shown in FIG. 1a. This is done in block 202.

At 204 the system locates primary key points of the subject. For a human figure these key points or extremities include the tips of the left and right hands, top of the head, and the bottom of the left and right feet. These are shown at points "P" in FIG. 3. At 206 the system determines whether the general locations of the primary key points are acceptable to the system. That is, are the extremities such as the ends of the hands and the feet and the head in an area where the system would normally expect to find them.

If the system does not find these extremities in the general locations, control returns back to block 202 where the system will take another input image of the subject aligning itself with the skeleton. This indicates that the subject is not yet properly aligned with the skeleton outline. If the locations of the primary key points are generally acceptable to the system, the process continues to block 208.

At 208 the system locates secondary key points of the subject. These are shown at points "S" in FIG. 3. The processing for determining these secondary key points depend on first properly locating the primary key points P of the subject. The secondary key points of a human figure are the left and right shoulders, the left and right arm pits, and the crotch. These points are located depending on where the system locates the primary key points as determined in step 204. Thus, for example, if in block 204 the system does not find the left and right key points properly, the system does not find the proper point for the crotch.

Similar to block 206, at 210 the system checks whether the secondary key points are located in areas where the system would generally expect to see them based on typical body proportions. If any one of them is not where the system expects to be, control returns to block 202. Once the locations of the ten key points, in the current example, (see FIG. 3) are determined, the system now has a definition of ten approximately linear segments that essentially connect these key points and define a general outline of the subject.

At 212 the system determines the locations of boundary points among the ten key points. These boundary points are located essentially by scanning the image in a certain direction, the direction depending on the orientation of the line segments between the key points. For example, a line segment between the left hand and the left arm pit would require a scan that begins at a certain offset away from the outline. The offset is determined by a bounding box whose corners are set by the key points of the segment, plus a pad of a fixed number of pixels, such as ten pixels in a preferred embodiment.

During the scan pixels in one vertical column are examined one by one. Many of the pixels scanned first would be background pixels until the scan reached the lower edge of the child's arm, at which point the scan would detect a foreground pixel. It would then mark this pixel as a boundary point. This procedure is done for all the columns in the approximately linear segment between the hand and the arm pit.

The collection of these boundary points can be seen as a silhouette line which is further refined to form part of a closed curve such that the curve will define the outline of the object. For example, a segment that goes from the left arm pit to the left foot would require a horizontal scan, scanning each pixel in a horizontal row until the scan reached a pixel indicating a foreground pixel. That pixel will be marked as a boundary point in the linear segment between the left arm pit and left foot.

Thus, once the process in block 212 is complete, the system has a series of boundary points that defines fairly closely the outline of the object but still includes nuances and aberrations, i.e. noise, that are on the edges of the object. The key points are used as start and stop delimiters in the scans. The boundary points are stored in a one-dimensional array. Thus, in a preferred embodiment, all the boundary points determined from the ten scans are stored in sequence in this one-dimensional array.

At 214 the system performs a series of smoothing filters to reign in aberrant boundary points, thereby reducing some of the noise in the object's edge. A basic assumption made by the system in applying these filters is that edges between key points are relatively smooth curves. One of the filters, in a preferred embodiment, is a Gaussian model applied to dampen noise in the edges, as represented by the boundary points. In a preferred embodiment, the Gaussian model uses a window or range of about five pixels. The effect of applying the Gaussian model is to bring boundary points that deviate significantly from surrounding boundary points closer to their surrounding boundary points. It has the effect of dampening or lessening the difference between an aberrant point and points in its vicinity.

The Gaussian model smoothing procedure has the effect of a low-pass filter applied to the boundary points. The window used in the Gaussian model is set so that an appropriate smoothing of the boundary points occurs. If the window of boundary points for the Gaussian model is too large, the overall effect is an averaging effect over the boundary points which is generally not desirable due to the lack of accuracy. If the window is too small there is essentially no smoothing effect on the boundary points.

The other smoothing filter is known in the art as a least-square filter which also uses an appropriately sized window of pixels. All the boundary points within the window are aligned or brought closer to a line that is fitted to the boundary points within the window. Thus, the least-square method is a way of fitting a line through the boundary points in a window. The system minimizes the sum of the squares of deviations from the line. The system then places boundary points so that they fit close to or on the line.

At 216 the system runs a snake algorithm to further eliminate noise from the edge of the object. The boundary points comprise a line that make up one input to the snake algorithm. In the application of the snake algorithm as used in the present invention, there are attractive forces acting on the line that bring the line closer to a noise-reduced edge of the object. At the same time the line, or "snake," itself has an internal energy that tends to keep the snake in its original shape to some degree. Thus, there is a tension between the attractive force of the edge of the object and the natural tendency of the line to keep its original shape. The snake has sufficient internal energy so that it can ignore significant deviations in the edge of the object. As with the smoothing filters, the key points do not move as a result of the snake algorithm acting as anchors. The snake itself, however, is elastic and can stretch or shrink to match the edge as needed.

The forces, both from external features, that attract the snake to the edge are (1) an edge strength, and (2) an alpha image. The snake has a tendency to align itself along a portion of the alpha image such that on one side the alpha pixels are zero and on the other side the alpha pixels are one.

A Canny edge detector is used to determine the edge strength. The Canny algorithm is a well-known method for detecting edges. The Canny filter is applied to the input image itself, not the alpha image. Thus, in a preferred embodiment, the snake algorithm has generally three inputs. One is from the Canny filter performed on the input image, another is the alpha image, and the third is the contour line made up of boundary points between two key points.

The snake algorithm is well-known in the field of computer vision and operates as an energy minimization procedure. In a preferred embodiment, the snake algorithm takes into account three sources of energy, as described above, in making the snake represent a clean edge of the object. In the present implementation of the snake algorithm the boundary points comprising the snake can move in only one dimension, either left or right, or up and down. This has the effect of greatly increasing the speed of adjustment iterations made by the snake. The class of snake applied in the process is determined essentially by how much weight is given to the different sources of energy.

With reference to FIG. 2c, at 220 the system connects the boundary points such that there is a complete or closed loop of pixels constrained by the boundary points. This is necessary because the area fill that eventually fills in the area within the closed loop, will not perform well if there are gaps between the boundary points. Thus, even if the boundary points are sequentially ordered, they may not be adjacent. Therefore, extra pixels may have to be added so that there are no pixel gaps between them. Once the boundary loops are connected, thereby forming a closed loop, a standard area fill algorithm is used to generate an improved alpha image. This alpha image can subsequently be used to create a clean background subtracted image. A standard area-fill is accomplished at 222, and the process is complete.

Returning to blocks 204 and 208, the system locates the key points using a general search area and a key point template. Each of the key points have a general search area associated with it. The general search area is the area within which the system expects to find the key point. A template is used to search within the general search area to locate the best region, i.e., the region most likely to be precise key point, within the general search area.

In performing this process, the system uses the alpha image of the subject. Thus, pixels within or on the edge of the subject have a value of one, for example, and pixels outside the subject have a value of zero. Each key point has a specially configured template, although a template for the right hand key point is a mirror image of the template for the left hand key point, and similarly for the left and right feet, shoulders, and armpits.

The template resembles a miniature alpha image. A typical size of a template (significantly smaller than the general search area) is 20 pixels by 20 pixels, in a preferred embodiment. The pixels that have a value of one within the template make up a shape that resembles the expected shape of the key point being search for.

In a preferred embodiment, template patterns are restricted to be rectangles, so that a Summed Area Table (S.A.T.) facilitates an efficient search. The template is applied to each 20 by 20 region within the general search area. Each time it is applied, the system determines how many of the "one" alpha pixels in the template match the "one" alpha pixels in the subject image. The region in the subject alpha image that has the highest similarity score is determined to be the key point. This process is done for all the primary and secondary key points.

If none of the regions in a general search area gets a similarity score above a certain threshold after being checked by the template, the system assumes that the subject did not strike a pose that generally matched the skeleton and waits for another pose, thereby returning control to block 202. This is one way for the system to determine if primary key points and secondary key points are ascertainable given the subject's alignment with the skeleton.

Figure 3:
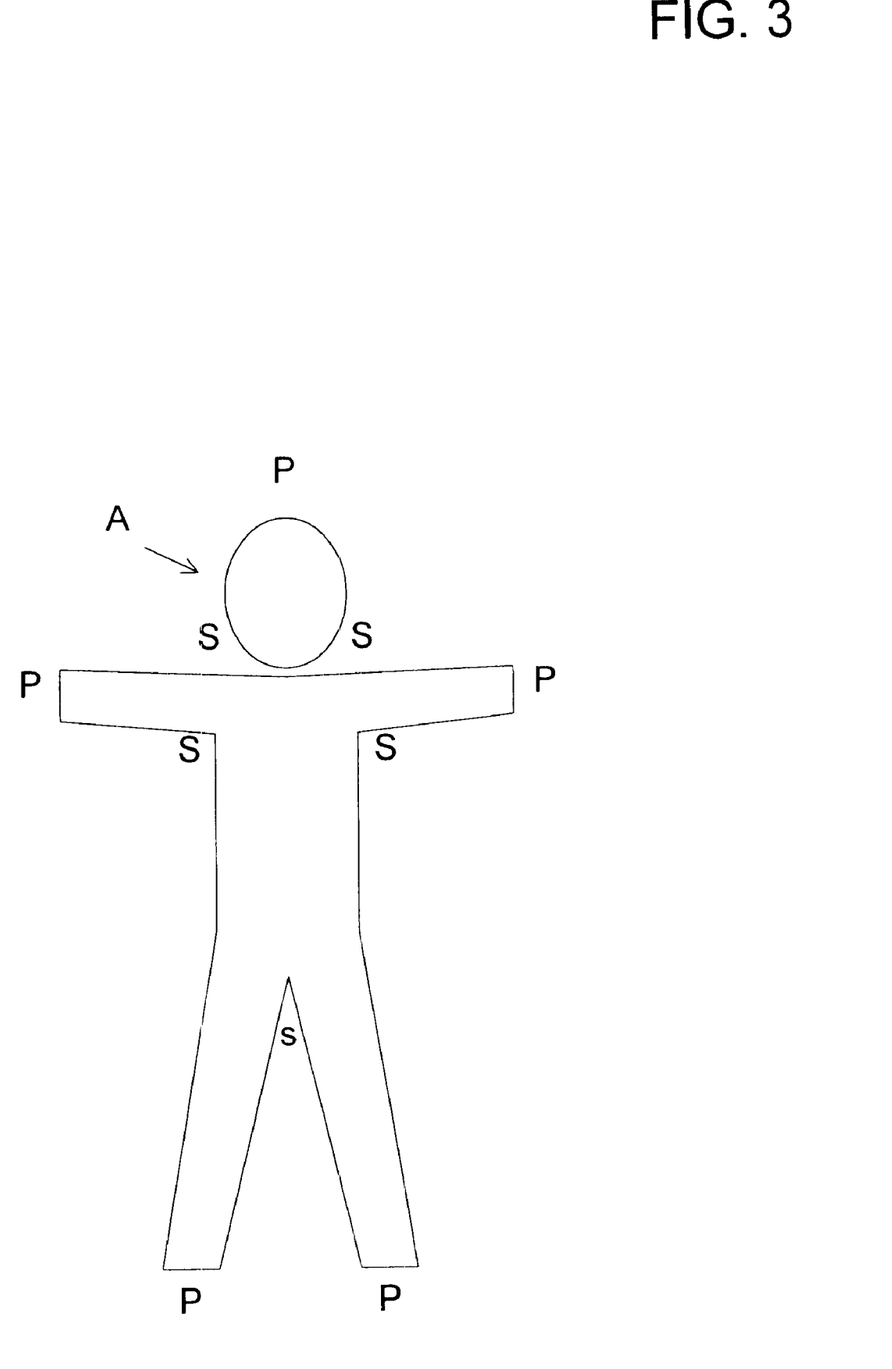
FIG. 3 illustrates ten key points on a "skeleton" used by the method and apparatus of the present invention.

FIG. 3 illustrates ten key points(labeled "S" and "P") associated with a skeleton A in accordance with the present invention. It should be noted that more or fewer key points can be used, as will be appreciated by those skilled in the art. The key points "P" are primary key points, and are located at the extremities of the skeleton A. The key points "S" are secondary key points, and are located proximate to the torso of the skeleton A at the points where the limbs and neck attach to the torso.

While this invention has been described in terms of several preferred embodiments, it will be apparent to those of skill in the art that various equivalents, permutations, and additions thereof are within the scope of the present invention. It is therefore intended that the following appending claims include all such equivalents, permutations and additions as fall within the true spirit and scope of the present invention.

What is claimed is:

1. A background subtraction apparatus comprising:

key point location means for locating key points on a known object type, wherein said key point location means includes an alignment detector for detecting alignment of an image of said known object type with a skeleton image;

repeat keypoint location means if said alignment detector fails to align said image with said skeleton image;

boundary point location means for, after locating key points on a known object type, locating boundary points of said known object that comprise edges of said known object;

repeat keypoint location means and boundary point location means if locating boundary points fails; and edge processing means for, after locating key points on a known object type, processing said edges to provide a clean-edged extraction of said known object from a background image.

2. A background subtraction apparatus as recited in claim 1 wherein said skeleton image is an exoskeleton image.

3. A background subtraction apparatus as recited in claim 2 wherein said known object is a human being.

4. A background subtraction apparatus as recited in claim 3 wherein said key points include primary key points at extremities of an image of said human being and secondary key points near a torso of an image of said human being.

5. A background subtraction apparatus as recited in claim 1 wherein said boundary point location means includes a scanner for scanning an image of said known object dependent upon the orientation of line segments between said key points.

6. A background subtraction apparatus as recited in claim 1 wherein said edge processing means includes at least one filter.

7. A background subtraction apparatus as recited in claim 6 wherein said filter includes at least one of a Gaussian model filter and a least-square filter.

8. A background subtraction apparatus as recited in claim 6 wherein said edge processing means further includes applying a snake algorithm to said edges.

9. A background subtraction apparatus as recited in claim 8 wherein said edge processing means further includes a boundary point connector.

10. A method for subtracting a background comprising:

locating key points on a known object type, wherein locating said key points includes detecting the alignment of an image of said known object type with a skeleton image;

repeat locating key points if the alignment fails to align said image with said skeleton image;

locating, after locating key points on a known object type, boundary points of said known object that comprise edges of said known object;

repeat locating key points and locating boundary points if locating boundary points of said known object fails; and processing, after locating key points on a known object type, said edges to provide a clean-edged extraction of said known object from a background image.

11. A method for subtracting a background as recited in claim 10 wherein said skeleton image is an exoskeleton image.

12. A method for subtracting a background as recited in claim 11 wherein said known object is a human being.

13. A method for subtracting a background as recited in claim 12 wherein said key points include primary key points at extremities of an image of said human being and secondary key points near a torso of an image of said human being.

14. A method for subtracting a background as recited in claim 10 wherein locating boundary points includes scanning an image of said known object dependent upon the orientation of line segments between said key points.

15. A method for subtracting a background as recited in claim 10 wherein processing said edges includes filtering said edges.

16. A method for subtracting a background as recited in claim 15 wherein said filtering includes at least one of a Gaussian model filtering and a least-square filtering.

17. A method for subtracting a background as recited in claim 15 wherein said processing said edges further includes applying a snake algorithm to edges.

18. A method for subtracting a background as recited in claim 17 wherein said processing said edges further includes connecting said boundary points.

19. A computer readable media including program instructions implementing the method of claim 10.

20. A method for subtracting a background as recited in claim 10, wherein said skeleton image is a stick figure image.

21. A method for subtracting a background as recited in claim 10, wherein the known object adjusts a position to match the skeleton image.

22. A method for subtracting a background as recited in claim 10, wherein secondary points are located relative to the location of said key points.

* * * * *